United States Patent
Villar et al.

(10) Patent No.: US 9,773,415 B2
(45) Date of Patent: Sep. 26, 2017

(54) SYSTEM AND METHOD FOR SURFACE VEHICLE TRAJECTORY DESCRIPTION

(71) Applicant: The Boeing Company, Chicago, IL (US)

(72) Inventors: Victor Perez Villar, Madrid (ES); Grzegorz M. Kawiecki, Madrid (ES); Lars Fucke, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/661,420

(22) Filed: Mar. 18, 2015

(65) Prior Publication Data

US 2015/0294564 A1   Oct. 15, 2015

(30) Foreign Application Priority Data

Apr. 11, 2014   (EP) ..................... 14382141

(51) Int. Cl.
*G08G 9/00* (2006.01)
*G08G 1/16* (2006.01)
(Continued)

(52) U.S. Cl.
CPC .......... *G08G 1/164* (2013.01); *G05D 1/0214* (2013.01); *G05D 1/0217* (2013.01); *G08G 1/092* (2013.01); *G08G 1/127* (2013.01); *G08G 1/20* (2013.01); *G08G 9/00* (2013.01); *G05D 2201/0216* (2013.01); *G08G 5/065* (2013.01)

(58) Field of Classification Search
CPC .... G08G 1/0968–1/0969; G08G 1/164; G08G 1/20; G08G 1/127; G08G 5/0013; G08G 5/0017–5/0026; G08G 5/0043; G08G 5/06; G08G 5/065; G08G 7/00; G08G 9/00; G05D 1/0212–1/0217;
(Continued)

(56) References Cited

U.S. PATENT DOCUMENTS 5,602,739 A    2/1997  Haagenstad et al.
6,169,495 B1 *  1/2001  Koike ................. B61L 27/0016
                                                    340/435
(Continued)

FOREIGN PATENT DOCUMENTS

EP     2040137     3/2009

OTHER PUBLICATIONS

European Patent Office; European Search Report for Application No. EP14382141 dated Oct. 24, 2014.

*Primary Examiner* — Spencer Patton
(74) *Attorney, Agent, or Firm* — Parson Behle & Latimer

(57) ABSTRACT

System and method including a plurality of surface vehicles and a plurality of events to be performed by each of the surface vehicles. Each of the vehicles is equipped with an electronic control unit including a receiver and a decoder for the instructions received from a vehicle movement optimizer. The plurality of events include instructions of movements from an origin to a destination, and actions for each of the surface vehicles. The decoder decodes instructions received from the surface vehicle movement optimizer. The optimizer configures an optimized schedule of the preliminary plan by modifying the events based on either the vehicle attributes or updates submitted by the electronic control unit from the vehicle to the optimizer.

20 Claims, 3 Drawing Sheets

(51) Int. Cl.
  *G08G 1/127* (2006.01)
  *G08G 1/09* (2006.01)
  *G08G 1/00* (2006.01)
  *G05D 1/02* (2006.01)
  *G08G 5/06* (2006.01)

(58) Field of Classification Search
  CPC .. G05D 1/0223; G05D 1/0287; G05D 1/0289; B61L 27/00; B61L 27/0011–27/0027
  See application file for complete search history.

(56) References Cited

U.S. PATENT DOCUMENTS

| | | | |
|---|---|---|---|
| 2003/0040849 A1 | 2/2003 | Hathout et al. | |
| 2004/0034556 A1* | 2/2004 | Matheson | B61L 27/0016 705/7.24 |
| 2009/0051510 A1* | 2/2009 | Follmer | G07C 5/008 340/425.5 |
| 2009/0150013 A1 | 6/2009 | Finn et al. | |
| 2012/0277941 A1* | 11/2012 | Noffsinger | B63B 49/00 701/21 |
| 2013/0144466 A1 | 6/2013 | Cooper et al. | |
| 2013/0144467 A1* | 6/2013 | Kickbusch | B61L 3/006 701/2 |
| 2015/0066561 A1* | 3/2015 | Wills | G06Q 10/06313 705/7.23 |

\* cited by examiner

SYSTEM AND METHOD FOR SURFACE VEHICLE TRAJECTORY DESCRIPTION

CROSS-REFERENCE TO RELATED APPLICATIONS

This application claims the benefit of E.P. application number 14382141.1 entitled "System and Method for Surface Vehicle Trajectory Description" filed in the European Patent Office on Apr. 11, 2014, the disclosure of the above-noted application is incorporated by reference herein in its entirety.

FIELD OF THE DISCLOSURE

The present description discloses a system and a method to describe the intended trajectory of a surface vehicle and the operations needed to be performed in order to achieve the objective of a plan. The system and the method may be applied, e.g., to airport apron vehicles, such as passenger buses, cargo transports for the goods of the aircrafts or fuel tanker trucks. This system and method may be applied, as well, to other vehicles and environments, such as driverless vehicles.

BACKGROUND OF THE DISCLOSURE

Description of Related Art

Accurate aircraft trajectory predictions are very important for safety and efficiency of air traffic.

There are currently over 60 million flight operations per year in the United States being handled by only 500 towered airports, which makes for a high-speed, hectic environment where even a small mistake can result in a major mishap.

A novel aircraft flight trajectory coding has been disclosed in Patent EP 2 040 137 A1, also property of BOEING, the disclosure of which is incorporated by reference herein in its entirety. This document describes a computer-implemented method of describing aircraft intent expressed using a formal language. That description may be used to predict aircraft trajectory, for example, for air traffic management purposes. Rules are used in association with information provided to generate a set of instructions describing both the aerodynamic configuration of the aircraft and the motion of the aircraft. These instructions are checked to ensure that they describe unambiguously the trajectory of the aircraft. The instructions are then expressed using a formal language.

However, that document is limited to fixed-wing trajectories.

Various methods of modeling aircraft surface trajectories are known in the state of the art. However, they do not suggest coding these trajectories using dynamic parameters required to control the aircraft.

The management of such high-density traffic, particularly in large, busy airports depends largely on well developed, rigorously observed procedures and on drivers' skills. The associated traffic complexity makes it difficult to optimize individual vehicle runs and the traffic volume makes the system vulnerable to human errors.

The size of air pollution generated by airport ground support equipment, including transport buses, generate harmful emissions which are expected to keep growing.

Although runway incursions are reported at only 14 incursions per million operations, as disclosed by the Federal Aviation Administration (FAA) Runway Safety in 2009, any incursion poses a danger to travelers and airport personnel alike. Consequently, the FAA is constantly searching for ways to improve the on-the-ground operations safety.

Another envisioned application is trajectory prediction and trajectory de-conflicting for future driverless vehicle traffic. Driverless transport was pioneered by BOEING with the Personal Rapid Transit system installed in Morgantown, W. Va. Progress towards driverless cars is very rapid and driving will become much more automated in the next five to ten years as experts forecast.

Many unmanned ground vehicles use ground trajectory descriptions based on waypoints. Mathematical curves representing trajectories through polynomials of 1st, 3rd and 5th order or clothoid (Euler curves) are frequently used.

However, these models do not consider vehicle parameters, what makes trajectory prediction difficult, particularly in congested environments.

Many proposed solutions for the de-confliction problem have focused on the estimation of vehicle position using visual cues or have been based on triangulation based on the application of GPS and other communications infrastructure.

However, the precision of vehicle localization using these methods may be too low to be trusted. Localization accuracy may be compromised by insufficient update rates in state-of-the-art systems and signal corruption caused by obstacles, adverse weather, sensor drift or sensor output bias.

The idea of finding the method to operate a given vehicle in order to follow a specific trajectory has been disclosed in Patent US 2003/0040849 A1, which is incorporated by referenced herein in its entirety. That document has mentioned that by "pre-defining the trajectory, the Electronic Stability Program (ESP) can use the inverse of the equations used to compute the trajectory to calculate the dynamics parameters required to control the vehicle to follow the pre-defined trajectory." The patent discloses a method and system for vehicle trajectory estimation. It is based on a vehicle having an Electronic Stability Program (ESP). Sensor data pertaining to dynamics of the vehicle is obtained with the ESP. Using the sensor data and vehicle dynamics parameters estimated by the ESP, an estimate of the trajectory of the vehicle is calculated. The acquisition of the sensor data and the calculation of vehicle trajectory estimates occur independently of any external signal communication infrastructure-based trajectory estimation tools.

However, this document does not suggest using these dynamic parameters to actually code the required trajectory of ground vehicles, as proposed in the present disclosure.

The usual approach is to present a terrestrial vehicle trajectory in terms of waypoint coordinates, frequently using spline or polynomial approximation (in a way, a spline subset). The disclosed method represents a completely different approach to trajectory definition.

SUMMARY

The present disclosure may provide systems and rigorous methods to describe the trajectory description of a surface vehicle and the operations to be executed along. The disclosed methods use a formal language based on standard instructions describing the way to operate a given vehicle. The intended trajectory is coded in terms of operations needed to be performed by a vehicle in order to travel from an original location to a final destination and the operations to be executed to achieve the objective of its mission.

Figure 1:
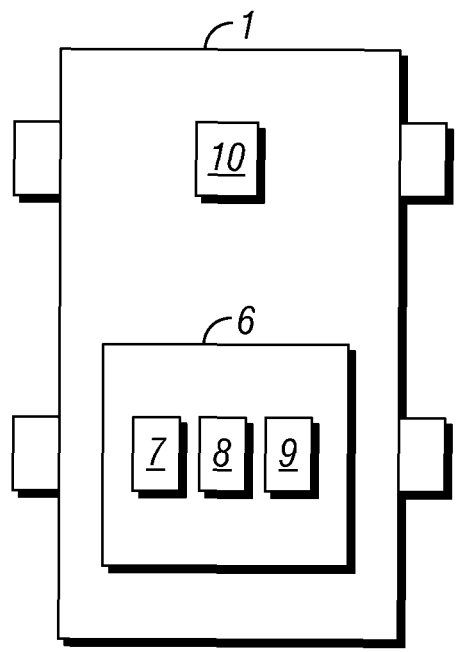
FIG. 1 represents a surface vehicle.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

The current disclosure of systems for terrestrial vehicles may be extendable to all other vehicles that may be operated using a specific set of commands.

Reasons to implement airport surface vehicle trajectory intent are mainly based on the reduction of accidents due to human errors. However, optimization of vehicle trajectories will not only improve safety, but will also help to reduce fuel consumption and environmental impact of various airport ground support vehicles.

The process of de-conflicting and optimizing of various vehicle trajectories may use two spatial coordinates and one temporal coordinate for each of the involved vehicles.

The disclosed methods make it possible to produce a 3-D trajectory information timely and accurately.

This present methods present the trajectory in terms of control operations necessary to execute a given vehicle intent and vehicle configuration elements, such as gear selection, for a given trajectory segment.

Control operations and vehicle configuration information represent input parameters to a system of equations that models any given vehicle's behavior. The output is trajectory parameters. Therefore, the trajectory is coded using control parameters that can be directly translated to the position of actuators that control the vehicle. In addition, the output depends on vehicle parameters.

The disclosed methods make it possible to code terrestrial vehicle intent in an unambiguous manner. The resulting trajectory prediction is based on vehicle's parameters. The disclosed methods make it possible to code the intended trajectory in terms of operations needed to displace the vehicle from its original location to its destination. That is why the trajectory of a vehicle may be described completely and accurately. Besides, this present disclosure facilitates the exchange of unambiguous intent information with other vehicles.

Portions of the presented method (the Terrestrial Intent Description Language "TIDL" language) is an improvement and extension of BR&TE-patented Aircraft Intent Description Language (AIDL) disclosed in the above mentioned patent EP 2 040 137 A1.

The proposed solution is a layered process that unambiguously describes the trajectory of a surface vehicle in order to enable optimized, highly predictable, potentially automated operations of such vehicles. This process may comprise three layers: a Strategic Layer, a Planning Layer and a Physical Layer.

The Strategic Layer contains the collection and expression of high level movement requirements, such as "drive from A to B and load passengers" or "taxi from active runway to gate."

These high level requirements are, then, translated in the Planning Layer into detailed and sequenced movements and actions of the surface vehicle (1), known as events (2). In this step, geographic information as well as other supplemental information, such as active runway information, are used. The main elements of the Planning Layer are event (2) description and surface vehicle (1) description modules.

FIG. 1 represents a surface vehicle (1) including a transmitter (10) and an electronic control unit (6) having a receiver (7), a decoder (8), and a sensor (9). The surface vehicle (1) may include, e.g., airport apron vehicles, such as passenger buses, cargo transports for the goods of the aircrafts or fuel tanker trucks.

Figure 2:
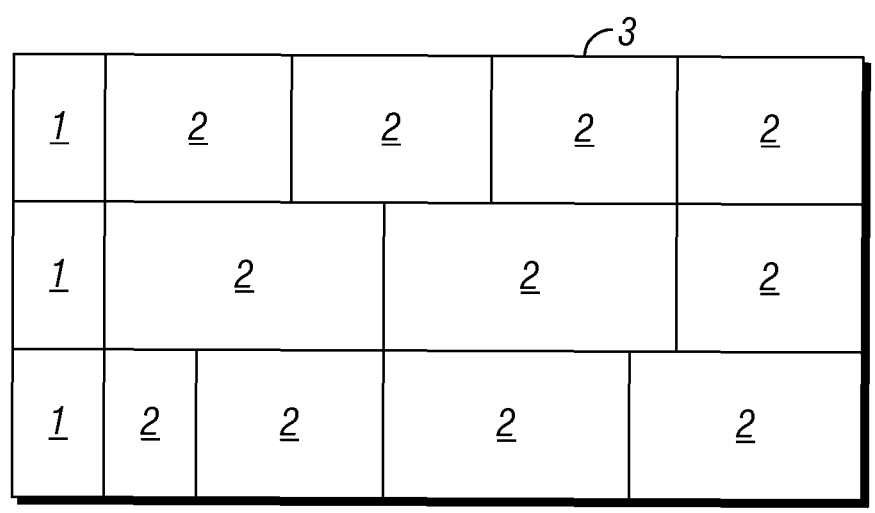
FIG. 2 represents an initial schedule or preliminary plan in the planning layer of the process.

FIG. 2 represents an initial schedule or preliminary plan (3) in the planning layer of the process where, as an example, three surface vehicles (1) have been considered to perform four, three and four events (2) respectively.

Figure 4:
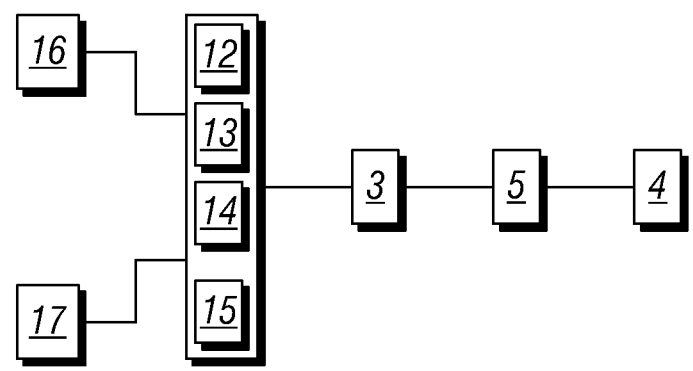
FIG. 4 represents the process of transmission of information and optimization process.

This preliminary plan (3) is scheduled from initial information based on initial service requirements (17) and surface operations (16) needed to be performed due to activity originated by aircraft movements and operations as shown in FIG. 4.

The structure for the plurality of events (2) to be performed by each of the surface vehicles (1) may be based on information contained in three different modules:

First, a constraints (13) module, containing information concerning event (2) constraints (13) such as maximum speed, maximum longitudinal acceleration and maximum lateral acceleration, time sequence to organize an event (2) and sequence of the events (2) to be performed.

Second, a path (14) module, containing information concerning the path (14) attributes, making a difference between a straight path (14) and a curved path (14). The straight path (14) is defined by features such as distance and heading. The curved path (14) is defined by a radius and an angle.

Third, an actions (15) module, containing information concerning actions (15) to be performed, including parameters such as load or unload cargo, dock from or undock to other vehicles or structures, and the duration and location of these events (2).

The events (2) have to consider a vehicle attributes (12) module containing information such as physical dimensions and dynamic limitations of the surface vehicle (1): speed, acceleration, deceleration and radius and a final module containing information of the event (2) itself based on the parameters such as cost and duration of each event (2) or the range and endurance of the event (2).

Figure 3:
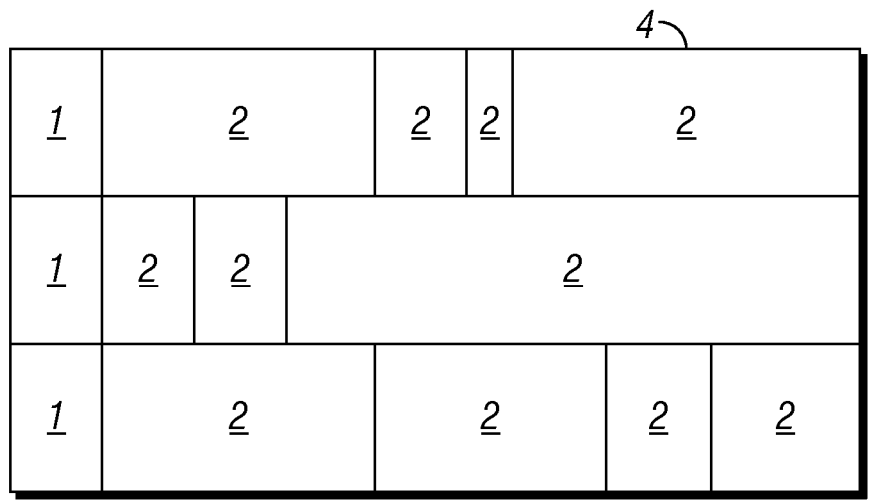
FIG. 3 represents an optimized schedule generated from the preliminary plan.

FIG. 3 represents an optimized schedule (4) in the planning layer based on the preliminary plan (3) of the process represented in FIG. 2. The optimized schedule (4) includes modifications due to updates (11), as shown in FIG. 5, submitted by at least one of the surface vehicles (1) to an electronic control unit (6).

FIG. 4 represents the process for reaching an optimized schedule (4). The initial preliminary plan (3), implementing a plurality of events (2) for a plurality of surface vehicles (1), is generated based on the initial service requirements (17) and surface operations (16) needed to be performed due to activity originated by aircraft movements and operations.

The plurality of events (2) is organized considering the above mentioned constraints (13), path (14) and action (15) modules which contain all basic information of all elements involved in the procedure to create a preliminary plan (3). This preliminary plan (3) is implemented if no information gets to the optimizer (5). In case the optimizer (5) is activated, an optimized schedule (4) is generated and replaces the preliminary plan (3), which becomes obsolete.

Figure 5:
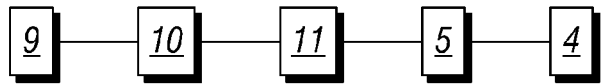
FIG. 5 represents the process for submitting updates from a vehicle and generates an optimized schedule.

FIG. 5 represents the process for reaching an optimized schedule (4) when the optimizer (5) has been activated with an update (11). A sensor (9) detects a malfunction or unexpected situation and via the transmitter (10) submits an update (11) to the optimizer (5).

Figure 6:
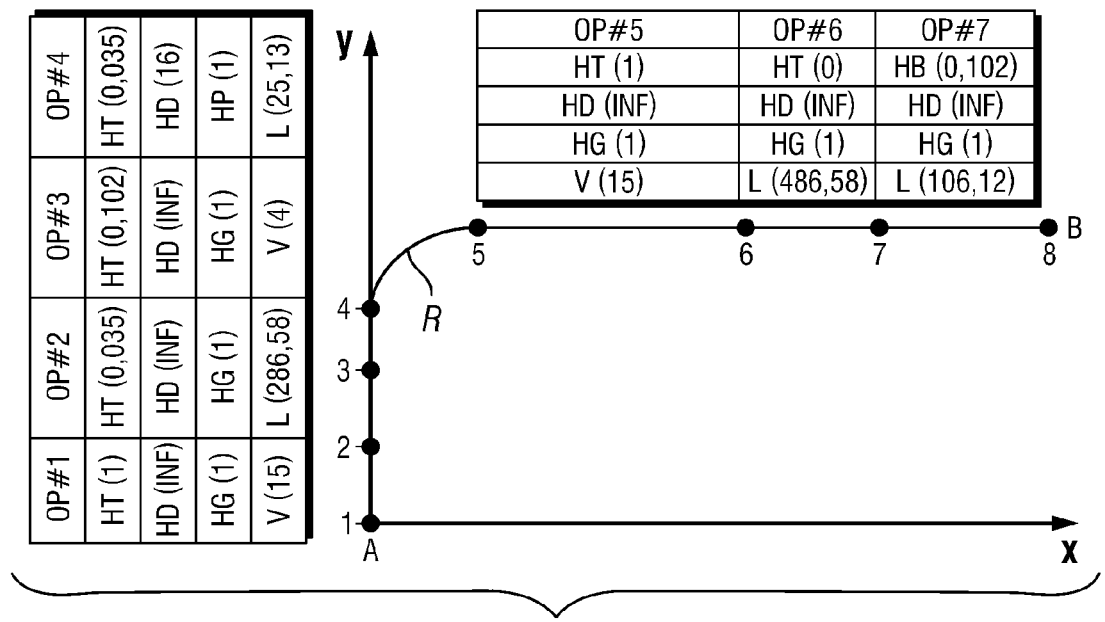
FIG. 6 represents an example of a surface vehicle trajectory description of a simple surface operation.

FIG. 6 represents an example of a vehicle description of a simple surface operation.

The events (2) represented in FIGS. 2 and 3 are sequenced sorted by surface vehicles (1). The events (2) are optimized after an initial schedule by modifying their timing or changing other parameters within the constraints (13) provided in the event (2) structure to ensure the desired operation. The basic requirement for the optimization process is to ensure that no surface vehicle (1) collisions occur. Additional optimization targets, such as minimum energy consumption, can be used, according to need and using additional parameters defined in the vehicle attributes (12) module.

The event (2) description structure shown in FIG. 2 is set up to allow for unambiguous and comprehensive description of all possible movements and actions (15) a given surface vehicle (1) can perform.

As above described, straight path (14) commands can be expressed as a path (14) between two points or distance and track; curved paths (14) are described using radius and heading change. To specify a dock/undock command a structure or other vehicle may need to be identified; to fully specify a load/unload command a vehicle to load or unload from and/or a duration may be required. The constraints (13) that can be imposed include path (14) constraints (13), such as maximum lateral and longitudinal path (14) acceleration (for passenger comfort and safety), maximum speed (for safety) as well as sequencing constraints (13) which can be expressed with respect to other events (2) (before, after) or in terms of absolute time (before, after, at). For sequencing constraints (13), a priority needs to be specified. Thus, hard constraints (13), as for example "load passengers before dispatching the bus" can be distinguished from soft constraints (13) which are not imperative, as for example "push back airplane before 10 am".

FIGS. 4 and 5 depict the process of generating an optimized schedule (4) from the preliminary movement plan (3). In the first step the intents are stacked in sequence for all vehicles (1) separately, taking into account all the time and event (2) based constraints (13). Using the additional vehicle (1) information stored in the corresponding module, surface operations (16) are then simulated, deconflicted and potentially optimized.

The final result, an optimized time-based schedule (4) is then sent out to the vehicles (1) using event (2) descriptors. The event (2) commands are translated in the vehicle (1) into vehicle-specific actuator commands, as for example throttle commands or steering wheel position.

This translation is performed using a language, Terrestrial Intent Description Language (TIDL) designed to represent any aspect of terrestrial vehicle motion or factors that influence that motion. That unique language constitutes a portion of the Surface Vehicle Intent Description system. The dynamic model, the system of equations modeling the vehicle (1) behavior, utilizes that input to predict the vehicle (1) behavior, including its trajectory. A set of exemplary TIDL instructions is shown in the table below.

TABLE 1

TIDL Alphabet

| | Symbol | Instruction |
|---|---|---|
| 1 | SL | Speed Law |
| 2 | HS | Hold Speed |
| 3 | ST | Set Throttle |
| 4 | TL | Throttle Law |
| 5 | HT | Hold Throttle |
| 6 | OLT | Open Loop Throttle |
| 7 | SD | Set Direction |
| 8 | DL | Directional Law |
| 9 | HD | Hold Direction |
| 10 | OLD | Open Loop Direction |
| 11 | SB | Set Brakes |
| 12 | BL | Brakes Law |
| 13 | HB | Hold Brakes |
| 14 | OLB | Open Loop Brakes |
| 15 | SG | Set Gear |
| 16 | HG | Hold Gear |

Please note that this set may be modified to reflect commands needed to operate any particular vehicle (1) steering system as, for example, a differential brake setting for directional control of an aircraft in specific on-the-ground setting. Also, note that this instruction set is designed to mesh with and to be complementary to that presented in patent EP 2 040 137 A1.

Real-time messages in the form of updates (11) from the moving vehicles (1), or other information of importance to the scheduling/optimization process, can be transmitted back from the vehicles (1) and used to update the plan (3). This situation takes place when a vehicle (1) is unable to perform an operation according to the time plan (3) due to a technical malfunction or due to an unexpected situation registered with a sensor (9). This sensor (9) maybe be located in the vehicle (1), as shown in FIG. 1, or the sensor (9) may be external to the vehicle (1). The sensor (9) can be, e.g., a video camera detecting an obstacle in the trajectory.

Besides the vehicle (1) event (2) descriptors, the schedule (4) optimizer (5) uses the vehicle (1) data module storing key data on the vehicle (1) limitations, dimensions and range as well as cost and duration information relating to event descriptors. Limitations include maximum speed, acceleration and deceleration and minimum turn radius. Dimensions describe the physical extent of the vehicle (1). The range can be expressed as distance or time (endurance). For every event (2) a time and/or a cost can be stored. Using the vehicle (1) data module the detailed scheduling step becomes possible.

Vehicle (1) event (2) and vehicle attributes (12) together form a language that allows fully describing vehicle (1) intent trajectory and capabilities and thus enables planning and optimization of surface operations.

The proposed solution encodes a desired trajectory of a surface vehicle (1), such as a passenger bus, based on the vehicle's motion parameters, such as maximum velocity or maximum acceleration. The system codes a trajectory for a plurality of ground vehicles, then optimizes that code based on the vehicles' motion parameters. The system's optimization allows for fewer collisions between ground vehicles, less harmful emissions, and fuel savings.

EXAMPLE

Consider executing a bus trip to transport passengers from Terminal A to a commercial jetliner waiting on the apron B. This situation is depicted in FIG. 6.

This requirement input to the Strategic Layer may be given using, for example, a touch screen to indicate start and end locations of the trip: A and B.

This input is passed to the Planning Layer that generates a schedule (4) taking in the consideration path (14), in the case of this example, a straight run from Terminal A to an intersection 1-4, the turn at the intersection 4-5 and the run from the intersection to the aircraft 5-8, the actions (15) of loading and loading the passengers, and other constraints (13), as might be maximum allowed velocity and accelerations and other vehicles (1) movements. In this particular case, the solution of the optimization step, indicates that legs 1-4 and 5-8 would actually need to consist of acceleration, steady state and deceleration intervals. The requirements to accelerate, maintain steady state, decelerate and turn would be executed using TIDL that translates the event (2) requirements into necessary, vehicle-specific, actuator output. Assume the following system parameters:

- distance from Terminal A to turn=1000 m
- distance from turn to aircraft position B=1200 m
- gravitational acceleration=9.81 m/s$^2$ (included in the External Conditions (EC) set)
- friction coefficient between tire material and apron surface=1.0 (included in the External Conditions (EC) set)
- bus motor torque=1500.0 Nm
- total vehicle mass during displacement (including passengers)=10000.0 kg
- radius of required turn=16.0 m
- radius of vehicle wheels=0.6 m
- acceleration, maximum allowable=0.25 m/s$^2$
- deceleration, maximum allowable=−1.0 m/s$^2$
- radial acceleration during turn, max allowable=1.0 m/s$^2$
- air density=1.2 kg/m$^3$ (included in the External Conditions (EC) set)
- cross-sectional area of the vehicle=9.0 m$^2$
- drag coefficient of vehicle body=1.0
- max vehicle velocity allowed=15.0 m/s
- electric motor with a transmission ratio of 1:1 (the sum of wheel torques is equal to the motor torque, therefore, everywhere HG (1))

$$F_x = m \ast \dot{v}_x - m \ast \omega_z \ast v_y$$

$$F_y = m \ast \dot{v}_y + m \ast \omega_z \ast v_x$$

$$M_z = \dot{\omega}_z \ast I_z$$

As mentioned before, the optimization solution requires that the required AB trajectory be divided into seven intervals. The set of equations requires certain specific input based on the desired ground vehicle motion parameters, for each of the intervals:

1-2: Acceleration from the stop at A (the airport Terminal). Bus throttle at a maximum: HT=1. The steering device set to zero turn (infinite turn radius): HD=inf. The bus accelerates until it reaches the maximum allowable velocity of v=15 m/s).

2-3: After achieving the maximum velocity, the bus proceeds with a constant forward velocity of v=15 m/s. The throttle is set to a minimum needed to overcome the air resistance: HT=0.035. Mechanical resistance has not been considered in this simplified model but can be easily implemented. The steering device is set to a zero turn: HD=inf. The bus needs to cover L=286.58 m before it starts to decelerate over the interval 3-4.

3-4: The bus needs to decelerate from the max velocity of v=15 m/s to the velocity of 4 m/s that cannot be exceeded if the maximum centrifugal acceleration experienced by the passengers of the turning bus is not to exceed the admissible 1 m/s$^2$. Brakes are applied at 0.102, in order to not to exceed the maximum allowable deceleration: HB=0.102 until v=4 m/s.

4-5: The bus turns with a turn radius of 16 m (HD=16). Its tangential velocity is of 4 m/s and it continues until the distance covered while turning is equal to 25.13 m.

5-6: Acceleration after exiting the turn. Bus throttle at a maximum: HT=1. The steering device set to zero turn: HD=inf. The bus accelerates until it reaches the maximum allowable velocity of v=15 m/s).

6-7: After achieving the maximum velocity, the bus proceeds with a constant forward velocity of v=15 m/s. The throttle is set to a minimum needed to overcome the air resistance: HT=0.035. The steering device is set to a zero turn: HD=inf. The bus needs to cover L=486.58 m before it starts to decelerate over the interval 7-8.

7-8: The bus needs to decelerate from the maximum velocity of v=15 m/s to a stop in front of the plane at B. At "7" the bus is located at a distance of L=106.12 m from the aircraft, which is exactly the distance needed to come to a halt if the maximum admissible deceleration of 1 m/s$^2$ is applied. HB=0.102. The steering device is set to a zero turn: HD=inf. See the table below for a summary of these parameters.

TABLE 2

Codification of the process.

| Element | 1-2 | 2-3 | 3-4 | 4-5 | 5-6 | 6-7 | 7-8 |
|---|---|---|---|---|---|---|---|
| Operation | OP 1 | OP 2 | OP 3 | OP 4 | OP 5 | OP 6 | OP 7 |
| Thread 1 | HT (1) | HT (0.035) | HB (0.102) | HT (0.035) | HT (1) | HT (0) | HB (0.102) |
| Thread 2 | HD (inf) | HD (inf) | HD (inf) | HD (16) | HD (inf) | HD (inf) | HD (inf) |
| CONFIG | | | | SG (1) | | | |
| Trigger | V (15) | L (286.58) | V (4) | L (25.13) | V (15) | L (486.58) | L (106.12) |
| EC | friction coefficient = 1; air density = 1.2 kg/m$^3$ | | | | | | |

The above parameters are shown in FIG. 6, for clarity.

The accuracy of the proposed method can be further improved through obtaining corrections from ESP systems, increasingly widespread in modern vehicles following the method disclosed in the above mentioned patent application publication number US 2003/0040849 A1.

Both the system and the method fulfilled by the system are disclosed in the current disclosure.

The system for surface vehicle (1) trajectory description comprises a plurality of surface vehicles (1), each of the surface vehicles (1) equipped with an electronic control unit (6) which in turn comprises a receiver (7) and a decoder (8) for the instructions received from a surface vehicle (1) movement optimizer (5).

The system also comprises a plurality of events (2) to be performed by each of the surface vehicles (1).

The plurality of events (2) comprise instructions of movements from an origin to a destination, and actions (15) for each of the surface vehicles (1).

The decoder (8) decodes instructions received from the surface vehicle (1) movement optimizer (5), so that the optimizer (5) configures an optimized schedule (4) of the preliminary plan (3) by modifying the events (2) based on the vehicle attributes (12) and updates (11) submitted by the electronic control unit (6) from the surface vehicle (1) to the optimizer (5).

At least one sensor (9) may be monitoring operation environments and a transmitter (10) submits updates (11) to the optimizer (5) every time the sensor (9) detects an unexpected situation that makes at least one surface vehicle (1) unable to perform according to plan (3), requiring a new optimized schedule (4) for the plurality of vehicles (1).

The transmitter (10) submits updates (11) to the optimizer (5) every time the surface vehicle (1) electronic control unit (6) detects a technical malfunction or other unexpected event (2) that makes the surface vehicle (1) unable to perform according to plan (3), requiring a new optimized schedule (4) for the plurality of vehicles (1).

The optimizer (5) then configures an optimized schedule (4) of the preliminary plan (3) by modifying the events (2). These events (2) are based on the vehicle attributes (12) and on vehicle (1) updates (11) that are submitted from the vehicle (1) to the electronic control unit (6).

The vehicle attributes (12) may comprise physical dimensions, dynamic limitations and operating terms.

The plurality of surface vehicles (1) may be driverless or comprise at least one driver.

The method fulfilled by the before described system comprises the following steps:
  i) receiving initial service requirements (17) in terms of a plurality of events (2) for each of the surface vehicles (1),
  ii) implementing a preliminary plan (3) for each of the surface vehicles (1) based on the plurality of events (2) and information concerning at least:
    a. the constraints (13), path (14) and actions (15) to be performed by a surface vehicle (1) and
    b. vehicle attributes (12),
  iii) compute an optimized schedule (4) from the preliminary plan (3) for the plurality of events (2) of the plurality of vehicles (1), based on
  iv) modify the optimized schedule (4) if the electronic control unit (6) of a surface vehicle (1) transmits an update (11) due to a technical malfunction or due to the detection of an unexpected situation by a surveillance sensor (9) that makes the optimized schedule (4) unable to be performed.
  v) transmit the optimized schedule (4) to each surface vehicle (1), The person skilled in the art will appreciate that variations may be made to the above described embodiments without departing from the scope of the disclosure defined by the appended claims.

The invention claimed is:

1. A system for surface vehicle trajectory description comprising:
  a plurality of surface vehicles, each of the surface vehicles equipped with an electronic control unit comprising a receiver, actuators for controlling the surface vehicle, and a decoder for instructions received from a surface vehicle movement optimizer;
  a plurality of events to be performed by each of the surface vehicles; and
  a constraints module containing at least one of a maximum longitudinal acceleration or a maximum lateral acceleration for each of the surface vehicles, wherein the plurality of events is based at least partially on the constraints module,
  wherein the plurality of events comprise instructions of movements from an origin to a destination, and actions for each of the surface vehicles, wherein the instructions further comprise information concerning the duration and location of the actions for each of the surface vehicles and wherein the actions comprise actions that differ from the instructions of movements from the origin to the destination,
  wherein the decoder decodes instructions received from the surface vehicle movement optimizer,
  wherein the surface vehicle movement optimizer configures an optimized schedule of a preliminary plan to meet at least one optimization target by modifying the events based on
    vehicle attributes or
    updates submitted by the electronic control unit from at least one of the surface vehicles to the surface vehicle movement optimizer,
  the optimized schedule including vehicle-specific actuator positions corresponding to the instructions of movements from the origin to the destination, the vehicle-specific actuator positions being divided into intervals between the origin and the destination, at least one interval including a throttle actuator position and a steering device actuator position.

2. The system of claim 1, wherein at least one sensor monitors surface operations and a transmitter submits updates to the surface vehicle movement optimizer every time the sensor detects an unexpected situation that makes at least one vehicle unable to perform according to the preliminary plan, requiring a new optimized schedule for the plurality of vehicles.

3. The system of claim 2, wherein the transmitter submits updates to the surface vehicle movement optimizer every time the vehicle electronic control unit detects a technical malfunction or other unexpected event that makes the vehicle unable to perform according to the preliminary plan, requiring a new optimized schedule for the plurality of vehicles.

4. The system of claim 1, wherein the vehicle attributes comprise physical dimensions, dynamic limitations and operating terms.

5. The system of claim 1, wherein the plurality of surface vehicles further comprise at least one driver.

6. The system of claim 1, wherein the plurality of surface vehicles are driverless.

7. The system of claim 1, further comprising a path module and an actions module, wherein the plurality of events is based on the constraints module, the path module, and the actions module.

8. The system of claim 7, further comprising a vehicle attribute module.

9. The system of claim 8, wherein the at least one optimization target is defined in the vehicle attribute module.

10. The system of claim 1, wherein the constraints module contains the maximum lateral acceleration for each of the surface vehicles.

11. The system of claim 10, wherein the path module contains information concerning path attributes for each of the surface vehicles.

12. The system of claim 11, wherein the actions module contains information concerning actions for each of the surface vehicles.

13. The system of claim 12, wherein the actions further comprise at least one of load cargo, unload cargo, dock to a vehicle, undock from a vehicle, dock to a structure, or undock from a structure.

14. The system of claim 1, wherein the actions further comprise at least one of load cargo, unload cargo, dock to a vehicle, undock from a vehicle, dock to a structure, or undock from a structure.

15. A method for surface vehicle trajectory description for a plurality of surface vehicles controlled by a surface vehicle movement optimizer and monitored by at least one sensor, each surface vehicle equipped with a transmitter, actuators for controlling the surface vehicle, and an electronic control unit incorporating a receiver and a decoder, the method comprising:
  i) receiving initial service requirements in terms of a plurality of events for each of the surface vehicles,
  ii) implementing a preliminary plan for each of the surface vehicles based on the plurality of events and information concerning at least:
    a. constraints, path and actions to be performed by the surface vehicle including a duration and a location of the actions, wherein the constraints and path provide for movements from an origin to a destination and wherein the actions comprise actions that differ from movements from the origin to the destination, wherein the constraints include at least one of a maximum longitudinal acceleration or a maximum lateral acceleration for each of the surface vehicles; and
    b. vehicle attributes,
  iii) computing an optimized schedule based on the preliminary plan for the plurality of events of the plurality of vehicles, the optimized schedule including vehicle-specific actuator positions corresponding to the movements from the origin to the destination, the vehicle-specific actuator positions being divided into intervals between the origin and the destination, at least one interval including a throttle actuator position and a steering device actuator position,
  iv) modifying the optimized schedule if the electronic control unit of at least one of the surface vehicles transmits an update due to a technical malfunction or due to the detection of an unexpected situation by a sensor that makes the optimized schedule unable to be performed, and
  v) transmitting the optimized schedule to each surface vehicle.

16. The method of claim 15, wherein the actions further comprise at least one of loading cargo, unloading cargo, docking to a vehicle, undocking from a vehicle, docking to a structure, or undocking from a structure.

17. The method of claim 16, wherein the actions comprise at least one of docking to a vehicle or undocking from a vehicle.

18. A system for surface vehicle trajectory description comprising:
  a plurality of surface vehicles, each of the surface vehicles equipped with an electronic control unit comprising a receiver, actuators for controlling the surface vehicle, and a decoder for instructions received from a surface vehicle movement optimizer; and
  a plurality of events to be performed by each of the surface vehicles,
  wherein the plurality of events comprise instructions of movements from an origin to a destination, and actions for each of the surface vehicles, wherein the instructions further comprise information concerning the duration and location of the actions for each of the surface vehicles and wherein the actions comprise at least one of dock to a vehicle or undock from a vehicle,
  wherein the decoder decodes instructions received from the surface vehicle movement optimizer,
  wherein the surface vehicle movement optimizer configures an optimized schedule of a preliminary plan to meet at least one optimization target by modifying the events based on
    vehicle attributes or
    updates submitted by the electronic control unit from at least one of the surface vehicles to the surface vehicle movement optimizer,
  the optimized schedule including vehicle-specific actuator positions corresponding to the instructions of movements from the origin to the destination, the vehicle-specific actuator positions being divided into intervals between the origin and the destination, at least one interval including a throttle actuator position and a steering device actuator position.

19. The system of claim 18, further comprising a constraints module, a path module, and an actions module, wherein the plurality of events is based on the constraints module, the path module, and the actions module.

20. The system of claim 19, wherein the constraints module contains at least one of a maximum longitudinal acceleration or a maximum lateral acceleration for each of the surface vehicles.

* * * * *